(12) United States Patent
Velissariou et al.

(10) Patent No.: US 7,833,560 B2
(45) Date of Patent: Nov. 16, 2010

(54) BEVERAGE DERIVED FROM THE EXTRACT OF COFFEE CHERRY HUSKS AND COFFEE CHERRY PULP

(75) Inventors: Maria Velissariou, Scarsdale, NY (US); Raymond Jay Laudano, Grayslake, IL (US); Paul Martin Edwards, Oxon (GB); Stephen Michael Stimpson, Oxon (GB); Rachel Lorna Jeffries, Northants (GB)

(73) Assignee: Kraft Foods R & D, Inc., Munich (DE)

( * ) Notice: Subject to any disclaimer, the term of this patent is extended or adjusted under 35 U.S.C. 154(b) by 1090 days.

(21) Appl. No.: 11/084,546

(22) Filed: Mar. 18, 2005

(65) Prior Publication Data

US 2006/0210689 A1 Sep. 21, 2006

(51) Int. Cl.
    *A23F 5/00* (2006.01)
(52) U.S. Cl. ................................. 426/590; 426/594
(58) Field of Classification Search .............. 426/44, 426/45, 49, 50, 590, 594, 595, 596, 597, 426/598
See application file for complete search history.

(56) References Cited

U.S. PATENT DOCUMENTS

| | | | |
|---|---|---|---|
| 2,526,872 A * | 10/1950 | Johnston et al. ............. | 426/460 |
| 4,316,916 A | 2/1982 | Adamer | |
| 4,478,854 A | 10/1984 | Adler-Nissen et al. | |
| 4,983,408 A | 1/1991 | Colton | |
| 5,087,468 A * | 2/1992 | Schulmeyr ................... | 426/386 |
| 6,572,915 B1 | 6/2003 | Drunen et al. | |
| 2002/0187239 A1 | 12/2002 | Miljkovic et al. | |
| 2005/0084566 A1* | 4/2005 | Bavan .......................... | 426/49 |

FOREIGN PATENT DOCUMENTS

| CN | 1273797 | | 11/2000 |
|---|---|---|---|
| JP | 04045744 | * | 2/1992 |
| JP | 2003210110 | * | 7/2003 |
| WO | WO 2004/098320 A1 | | 11/2004 |

OTHER PUBLICATIONS

Paradkar M M et al.: "Rapid Determination Of Caffeine Content In Soft Drinks Using FTIR-ATR Spectroscopy." Food Chemistry, vol. 78, No. 2, 2002, pp. 261-266, XP002391841.

(Continued)

*Primary Examiner*—Anthony Weier
(74) *Attorney, Agent, or Firm*—Greenberg Traurig, LLP

(57) ABSTRACT

A beverage formulation having a beverage having caffeine wherein the beverage contains caffeine levels in the range of about 0.07 to about 0.30 mg/ml, being optically clear, and having an added aroma; and wherein the beverage comprises an extract that is derived from at least one member of the group of coffee cherry husks and coffee cherry pulp; wherein the extract is in the range of about 5 to about 30% based on standardized extract of the beverage; wherein at least a portion of the caffeine is derived from the extract; wherein the optically clear is measured by a haze value of at least below about 10; and wherein at least a portion of the added aroma is derived from aroma recovered from the extract.

26 Claims, 2 Drawing Sheets

OTHER PUBLICATIONS

Database FSTA [Online] International Food Information Service (IFIS), Frankfurt-Main, DE; Ehlers G M: "Possible Applications Of Enzymes In Coffee Processing." XP002391863-& Food Review, vol. 11, No. 4, 1984, p. 37, 39.

Database FSTA [Online] International Food Information Service (IFIS), Frankfurt-Main, DE; Rodicker H et al: "Der Einsatz von Membran-Trennprozessen in der-Lebensmittelindustrie." & Lebensmittle-Industrie, vol. 23, No. 7, 1976, p. 303, Sektion Verfahrenstech., Ingenieurschule Kothen, German Democratic Republic. XP002391864.

Camaggio Sancineti G et al: "I Sottoprodotti Della Lavorazione Del Caffe Nota 2 The By-Products Of Coffe Production. Note 2" Industrie Alimentari, Chiriotti Editore,-Pinerolo, IT, vol. 34, No. 343, Dec. 1995, pp. 1283-1289, 1294, XP000981861.

Roberts's Coffee: "News" Internet Article, [Online] pp. 1-2, XP002391798; Retrieved from the internet: URL:http://www.robertscoffee.com/Englanti/sivut/index_eng.htm> -[retrieved on Jul. 24, 2006].

Carlos Rolz et al. "Pressing Of Coffee Pulp." Agricultural Wasters 2 (1980) pp. 207-214.

"The Merck Index" An encyclopedia of chemicals, drugs, and biologicals. Susan Budavari, Editor; Maryadele J. O'Neil, Associate Editor; Ann Smith, Assistant Editor;-Patricia E. Heckelman, Editorial Assistant; Published by Merk & Co., Inc. Rahway, N.J., U.S.A. 1989.

Paradise To Go, Hawaiian Foods Kona Coffee Tea from Hawaii Macadamia Nuts, http://web.archive.org/web/20030407062551/http://www.paradiserelocation.com/paradisetogo/foodproducts.htm Published 2003.

* cited by examiner

BEVERAGE DERIVED FROM THE EXTRACT OF COFFEE CHERRY HUSKS AND COFFEE CHERRY PULP

FIELD OF THE INVENTION

The present invention relates to beverage formulations derived, at least in part, from coffee cherry pulp and/or coffee cherry husks and having caffeine where at least a portion of the caffeine is derived from the naturally derived caffeine from coffee cherry husks and/or coffee cherry pulp and to methods of obtaining the beverage formulations derived from coffee cherry husks and/or coffee cherry pulp. In another embodiment, the present invention relates to beverage formulations further having good stability (e.g. optically clear) by removing a sufficient amount of the naturally occurring pectin and to methods of obtaining the beverage formulations derived from coffee cherry husks and/or coffee cherry pulp. In yet another embodiment, the present invention relates to beverage formulations further having aroma addition from the coffee cherry husks and/or coffee cherry pulp and to methods of obtaining the beverage formulations derived from coffee cherry husks and/or coffee cherry pulp.

BACKGROUND OF THE INVENTION

The coffee plant is a woody perennial evergreen dicotyledon that belongs to the Rubiaceae family. It has a main vertical trunk (orthotropic) and primary, secondary, and tertiary horizontal branches (plagiotropic). Two main species of coffee are cultivated today. Coffea arabica known as Arabica coffee accounts for 75-80% of the world's production. Coffea canephora, known as Robusta coffee, is more robust than the Arabica plants.

Arabica coffees are conventionally described either as "Brazils" (because they come from Brazil) or as "Other Milds" which come from elsewhere. Typica and Bourbon are the two best known varieties of C. arabica, but many strains have been developed, including Caturra (from Brazil and Colombia), Mundo Novo (Brazil), Tico (Central America), San Ramon and Jamaican Blue Mountain. Canephora coffee provides robusta beans. Robusta coffee is typically grown in West and Central Africa, throughout Southeast Asia, and parts of South America including Brazil, where it is primarily known as Conilon.

Coffee plants produce fruits, conventionally called "coffee cherries," that turn bright red when they are ripe and ready to pick. The coffee cherry's skin and pulp surround two beans enclosed in a parchmentlike covering. Specifically, beneath the cherries' red skin (exocarp) is a pulp (mesocarp), an outer layer (parenchyma), and a parchment-like covering of the bean (endocarp). The two, bluish-green coffee beans are covered by yet another membrane, called the spermoderm or silver skin.

Conventionally, the coffee cherry is not consumed directly by humans. Instead, the coffee cherry undergoes further processing to remove all of the layers from the desired value product (i.e. the coffee bean). Processing the coffee beans, or preparing them for roasting (i.e. for conventional human consumption), is typically conducted in one of two ways: 1) the dry method, or 2) the wet method. In wet processed coffee, two steps are used to remove all of the layers from the coffee bean: a) using a pulping machine, the beans are separated from the skin and pulp, which are washed away with water; and then b) hulling is used to remove the hull or dried parchment layer immediately surrounding the bean. In dry processed coffee, hulling is used to remove the husks or whole of the dried outer coverings of the original cherries.

For purposes of the present invention, the term "coffee cherry husk" shall mean: a) the husks or whole of the dried outer coverings of the original cherries surrounding the coffee beans and excludes the coffee bean, which is removed during the hulling using the dry method; and/or b) the hull or dried parchment layer immediately surrounding the bean and excludes the coffee bean, which is removed during the hulling using the wet method. For example, for purposes of the present invention, "coffee cherry husk" refers to the exocarp (i.e. the skin), the parenchyma, and/or the endocarp (i.e. the hull) or any combination thereof.

For purposes of the present invention, the term "coffee cherry pulp" shall mean at least the pulp of the coffee cherry but excludes the coffee bean that is removed during pulping using the wet method.

For purposes of the present invention, the term "optically clear" beverage formulation means a haze value of less than about 10 units measured by the test method disclosed herein.

SUMMARY OF THE INVENTION

In one embodiment of the present invention the beverage formulation comprises: a beverage being optically clear, wherein the optically cclear is measured by a haze value of at least below about 10; and wherein the beverage comprises an extract that is derived from at least one member of the group consisting of coffee cherry husks and coffee cherry pulp, and wherein the extract is in the range of about 5 to about 30% based on standardized extract of the beverage.

In another embodiment of the present invention. the beverage formulation comprises: a beverage having caffeine wherein the beverage contains caffeine levels in the range of about 0.07 to about 0.30 mg/ml; and wherein the beverage comprises an extract that is derived from at least one member of the group consisting of coffee cherry husks and coffee cherry pulp; wherein the extract is in the range of about 5 to about 30% based on standardized extract of the beverage; and wherein at least a portion of the caffeine is derived from the extract.

In a further embodiment of the present invention. the beverage formulation comprises: a beverage having caffeine wherein the beverage contains caffeine levels in the range of about 0.07 to about 0.30 mg/ml and having an added aroma; and wherein the beverage comprises an extract that is derived from at least one member of the group consisting of coffee cherry husks and coffee cherry pulp; wherein the extract is in the range of about 5 to about 30% based on standardized extract of the beverage; wherein at least a portion of the caffeine is derived from the extract; and wherein at least a portion of the added aroma is derived from aroma recovered from the extract.

In yet another embodiment of the present invention. the beverage formulation comprises: a beverage having caffeine wherein the beverage contains caffeine levels in the range of about 0.07 to about 0.30 mg/ml, being optically clear, and having an added aroma; and wherein the beverage comprises an extract that is derived from at least one member of the group consisting of coffee cherry husks and coffee cherry pulp; wherein the extract is in the range of about 5 to about 30% based on standardized extract of the beverage; wherein at least a portion of the caffeine is derived from the extract; wherein the optically clear is measured by a haze value of at least below about 10; and wherein at least a portion of the added aroma is derived from aroma recovered from the extract.

In another embodiment of the present invention. the beverage formulation of the above further comprises the steps of: extracting soluble constituents using water from at least one member of the group consisting of coffee cherry husks and coffee cherry pulp; separating the extract of the at least one member from the water; and concentrating the extract.

BRIEF DESCRIPTION OF THE DRAWINGS

The following figures are merely illustrative of the present invention and are not meant to limit the invention to the embodiments shown in the figures.

Figure 1:
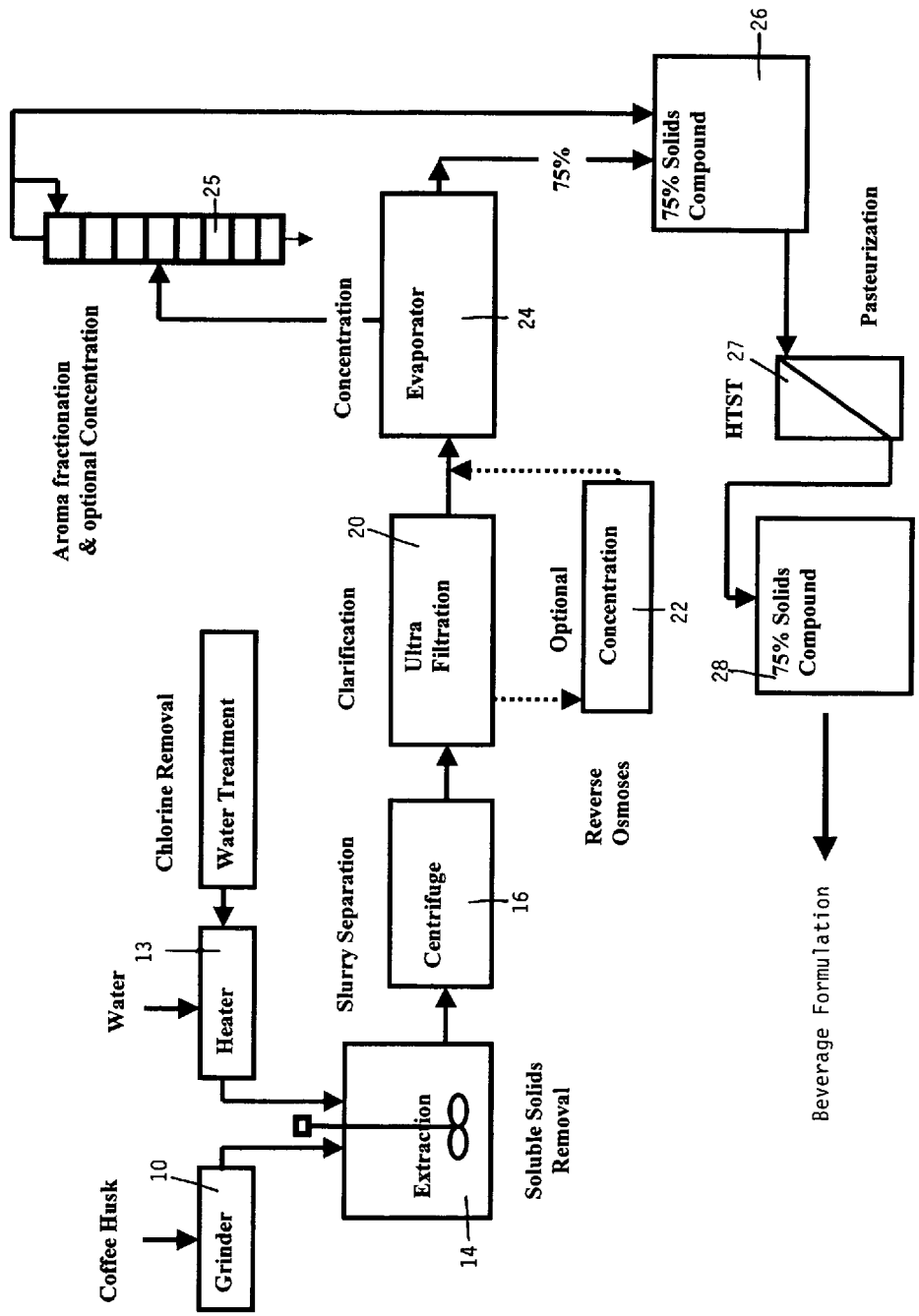
FIG. 1 is a process flowchart illustrating one embodiment of the present invention.
Figure 2:
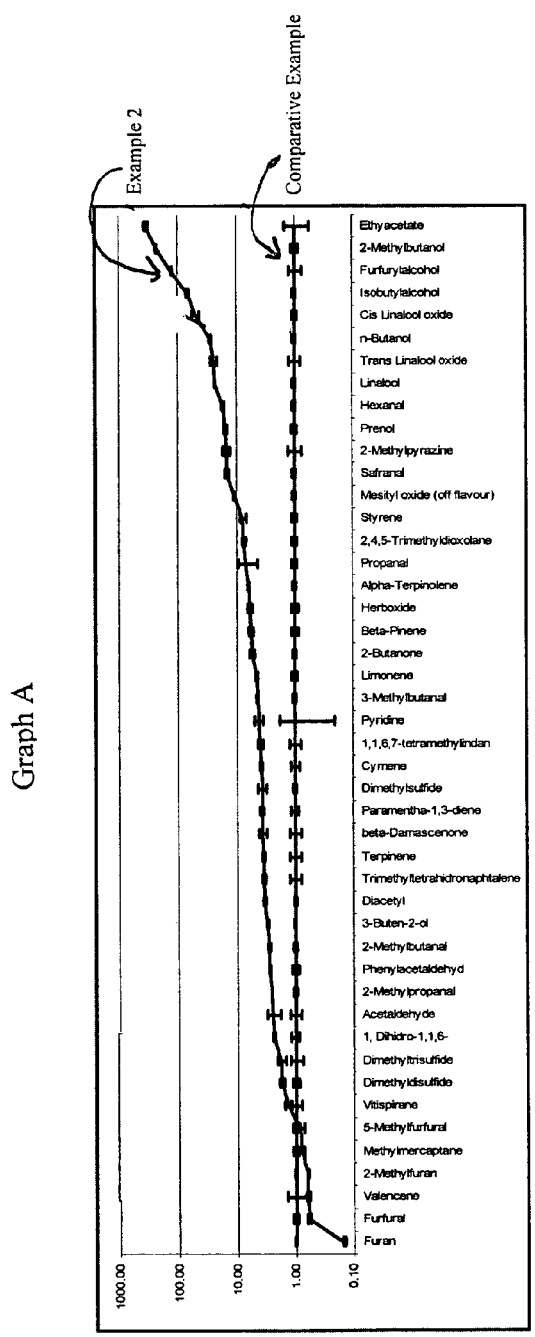
FIG. 2 is an aroma analysis of the extracted and concentrated coffee cherry husks of the Comparative Example to Example 2.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE PRESENT INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment, the present invention relates a method and resulting beverage formulation that extracts, clarifies and stabilizes coffee cherry husks. The resulting extract is used to produce a mildly stimulating beverage formulation containing a source of natural caffeine, which is derived from the coffee cherry husks. In one example, the resulting beverage formulation contains no artificial stimulating ingredients or preservatives.

In another embodiment, the present invention relates a method and resulting beverage formulation that juices, extracts, clarifies and stabilizes coffee cherry pulp. The resulting extract is used to produce a stimulating beverage formulation containing a source of natural caffeine, which is derived from the coffee cherry pulp. In one example, the resulting beverage formulation contains no artificial stimulating ingredients or preservatives.

In a further embodiment, the level of caffeine, which is derived from the coffee cherry husks and/or coffee cherry pulp, can be controlled and/or maintained in the resulting beverage formulation. For example, the level of caffeine, which is derived from the coffee cherry husks, can be regulated and/or maintained by one or a more of the following conditions: a) extraction conditions of the husk and/or pulp (e.g. temperature, residence time, draw off factor); b) ultra-filtration conditions; c) blend conditions of coffee extracts from variants of Caffea arabica and/or Caffea robusta; d) extract level conditions by adjusting the level of extract in the beverage formulation.

In one example, the beverage formulation of the present invention contains exclusively naturally derived caffeine from the raw material (i.e. coffee cherry husks and/or coffee cherry pulp). As such, in a specific non-limiting example, the beverage formulation of the present invention can be regulated and/or maintained to deliver caffeine levels equal to or higher than conventional Iced Teas, other commercial products (e.g. a coffee berry juice drink manufactured by Roberts Coffee of Helsinki Finland and named "Jahwa Cahwa"), conventional Colas, and conventional energy drinks (e.g. "Red Bull"). In another example, the beverage formulation of the present invention can be regulated and/or maintained to deliver caffeine levels that are lower than a typical coffee beverage.

In one example, the overall caffeine level of the beverage formulation of the present invention is derived exclusively from the naturally derived caffeine from coffee cherry husks and/or coffee cherry pulp and contains caffeine levels in the range of about 0.01 to about 0.5 mg/ml, more particularly 0.07 to about 0.3 mg/ml (which is equivalent to about 25 to about 106 mg per 355 ml serving). In another example, the overall caffeine level of the beverage formulation of the present invention is derived exclusively from naturally derived caffeine from coffee cherry husks and/or coffee cherry pulp and contains caffeine levels in the range of about 0.15 to about 0.30 mg/ml. In a further example, the overall caffeine level of the beverage formulation of the present invention is in the range of about 0.01 to about 0.5 mg/ml, more particularly 0.07 to about 0.3 mg/ml, where at least a portion of the caffeine is derived from the naturally derived caffeine from coffee cherry husks and/or coffee cherry pulp.

In a further embodiment, the level of caffeine, which is derived from the coffee cherry husks and/or coffee cherry pulp, can be controlled and/or maintained in the resulting beverage formulation. For example, the level of caffeine, which is derived from the coffee cherry husk, can be regulated and/or maintained by one or a more of the following conditions: a) extraction conditions of the husk (e.g. temperature, residence time, draw off factor); b) ultra-filtration conditions; c) blend conditions of coffee extracts from variants of caffea arabica and/or Caffea robusta; d) extract level conditions by adjusting the level of extract in the beverage formulation. In one example, the extraction conditions are: a temperature of about 65 to about 85 C; more particularly, about 70 to about 80 C, residence time of about 30 to about 90 minutes; and, in one example, the pH is about 3 to 3.3 with the addition of food acids (e.g. citric or malic), in another example, the pH is about 4.5. to about 5.5. In another example, the first stage filtration can occur at about 10 to about 60 C. In a further example, the aroma recovery can occur at about 82 (+/−about 3 C).

In another embodiment, the process for making a beverage formulation comprises obtaining a by-product from coffee cherry pulp and/or coffee cherry husks, intermixing the coffee cherry pulp and/or coffee cherry husks with water to produce an admixture comprised of a liquid portion and a solid portion, separating at least a part of the liquid portion from the solid portion to produce a liquid extract including separating a sufficient amount of pectin to result in a stable final product, concentrating the liquid extract to produce a concentrated extract, and intermixing the concentrated extract with additional components to produce a beverage formulation. In another example, an admixture containing water and a flavoring agent are intermixed with the coffee cherries and/or coffee cherry husks to produce an admixture.

In yet another embodiment, the temperatures during intermixing can range from about 65 C to about 80 C, more specifically, in the range of about 70 C to about 80 C. In another embodiment, prior to intermixing, the coffee cherry pulp and/or coffee cherry husks can be subjected to an additional process step or steps in order to enhance the efficient extraction of the desired substances from the coffee cherry pulp and/or coffee cherry husks. For example, the coffee cherry pulp and/or coffee cherry husks can be ground or sheared to reduce the size and increase the surface area of the solids. In another example, grinding or shearing can also take place during intermixing with water (e.g. wet milling). In one example, the wet milling of the coffee cherry pulp can have a contact time of about 15 to 30 minutes.

Suitable extractors include, but are not limited to, conventional stirred tank extractors, carousel extractors, screw extractors, supersonic extractors, percolator extractors or column extractors. For example, for a carousel extractor, in one example, the coffee cherry husks are filled by gravity into one chamber of the carousel. Extract is pumped from the sump to the top of the extractor and sprayed on the bed of husks. The liquid percolates through the bed and extracts the soluble solids. After a period of time, the carousel moves forward by one segment and the extraction starts again with a weaker extract. This is repeated segment by segment in a counter-current mode until the nearly exhausted husks are finally flushed with water and the exhausted husks removed. In one example, the extraction is conducted below 100 C.

In another embodiment, for a screw extractor, for example, the extraction unit operates on the counter-current extraction principle. In one example, the screw extractor includes an inclined trough surrounded by a heat transfer jacket. The coffee cherry husks enter the lower end of the trough and is transported upwards by two adjacent helical screw conveyors. As such, the solids are transported in a spiral movement that gives the counter-current plug flow extraction. In another embodiment, about 4 to about 10 parts, more particularly about 5 parts, and by weight of water based on the weight of coffee cherry husks is heated to between about 65 C. and 80 C. The water is added to the coffee cherry husk. The extractor can be jacketed or insulated to aid in temperature control. The flow of coffee cherry husk and water through the extractor can be co-current. The length, diameter and flow rates of the system are such that they provide a minimum contact time of at least about 8 to about 10 minutes, more specifically at least 60 minutes. The resulting slurry can be separated into extracted coffee cherry husk and extract or be sent on for further batch or continuous extraction. The extract is then optionally aroma stripped by conventional means and adjusted to the desired solids level, cooled and further processed.

In another embodiment, for a percolator extractor or column extractor, for example, coffee cherry husks are loaded into a first percolator. Extract is pumped through the bed of the husks in a cycle. The liquid is pumped through the husk bed. After a period of time, the extract from the first percolator is pumped out of the extractor unit and extract from a second percolator is used for extraction in the first percolator and the process continues. Fresh water is then introduced when the husks are nearly exhausted, which results in a counter-current operation.

In another embodiment, for a "Supersonic" extractor, for example, steam is introduced into an annular conditioning chamber that is wrapped around the core of the extraction unit. The steam is then injected into the process flow thereby creating momentum transfer. The extraction's unit geometry forces the steam to become supersonic forming a controllable shockwave. Mixing and heat transfer takes place in the controllable, low pressure, low density supersonic region.

In a further embodiment, the subsequent separating step is conducted by a methods comprising, but not limited to, decantation, pressing, filtration, settling, and centrifugation. In another example, the solid portion may be recycled for further intermixing to remove an additional amount of the targeted substance or substances.

FIG. 1 is a process flowchart illustrating one embodiment of the present invention. This figure is for illustration purposes and is not meant to limit the present invention. As first indicated in block 10, coffee husks are fed into a grinder. Heated water 12, which may be first treated (e.g. chlorine removal) 13, is fed into extractor 14. As indicated in block 14, water is applied to the coffee cherry husks to extract the desired soluble constituents. In one example, the coffee cherry husks are treated with about 4 to about 15 times larger amounts of water [at a constant temperature. The contact time between the coffee cherry husks and water is typically based on the type of extraction process utilized. Next, the solid residues of the coffee cherry husks are separated from the water and dissolved compounds (i.e. extract) by any suitable method, such as centrifugation as indicated in block 16. Subsequently, in block 20, the extract is then further filtered to remove a sufficient amount of the naturally occurring pectin so as to result in the final beverage formulation having stability (e.g. clarity). In an optional step, block 22, the clarified extract is further concentrated (e.g. using reverse osmosis). The extract is then concentrated as indicated in block 24 to produce a concentrated extract, block 26 (e.g. 75% solids). Optionally, the concentrator 24 (e.g. evaporator) is fitted with a pre-stripping section to recover volatile components (i.e. aroma) of the extract. The volatile components are recovered, as illustrated by block 25 (e.g. aroma fractionation and, optionally, aroma concentration). The resulting concentrated extract, block 28, is ready for use in the beverage formulation after pasteurization (block 27) in block 26. The collected aroma components are added back to the concentrate, as illustrated in block 26.

In another embodiment, the process conditions comprise extraction, clarification, ultra-filtration, pasteurization, aroma recovery, evaporation, storage and filling. It is understood that the order of process steps may be changed (e.g. aroma recovery, evaporation). For example, suitable extraction equipment includes, but are not limited to, tank extraction, DigMaz, coffee columns and carousels. In another example, the extraction time may be in the range of about 30 and 90 minutes at a temperature of about 65 to 80 C with a draw-off of about 5 to 7. In another example, suitable clarification equipment includes, but are not limited to, disc centrifuge and decanters. In yet another example, the clarification may be conducted at about 50 C. For pasteurization, for example, indirect steam heating may be used for about 2 seconds at 120 C. For aroma recovery, for example, a plate heat exchanger may be employed at about 75 C. For filling, for example, suitable methods include, but are not limited to, hot fill at about 20 seconds at 96 C. For processing of coffee cherry pulp, an optional step of wet milling may be added prior to extraction.

In yet another embodiment, suitable processing methods of removing a sufficient amount of the naturally occurring pectin comprise, but are not limited to: a) an enzyme treatment is performed by adding pectinase; b) ultra-filtration treatment (e.g. membrane technology); and/or c) chemical treatment (e.g. calcium compound employed to form a precipitate or gel with the pectin for subsequent removal by precipitation).

In one embodiment, the ultra-filtration treatment utilizes membrane filtration. For example, a "Super-Cor" module from Koch Membrane Systems, Inc. is utilized. In another specific example, a Koch "Super-G" module consists of four one-inch diameter HFM-180 ultra-filtration membrane tubules.—In another embodiment, an "A19" tubular UF system by PCI membranes is utilized containing FP200 membranes. In another example, the ultra-filtration system contains membranes with a range of 150000 (Koch) to 200,000 (PCI) kDalton cut-off to take account of membrane pore size difference between the suppliers.

In a further example of enzyme treatment, generally, there are two major types of pectin low and high methoxy pectin. The physical and chemical reactions exhibited by each are typically different. Low methoxy pectin tends to be susceptible to calcium ions and may be gelled or precipitated by contacting the extract with calcium chloride. In one embodiment the above mentioned precipitate may be filtered from the liquid using conventional methods to reduce the level of pectin In another embodiment, the pectinase, which is utilized in the method of the present invention, is produced by microorganisms of the genus *Aspergillus aculeatus*. For example, the pectinase and/or mannase is added to extract to obtain a first mixture, and holding the first mixture for a predetermined time period while agitating the first mixture to thereby obtain a slurry. After the enzyme treatment, the enzyme is inactivated (e.g. pasteurization). In another example, pectinase is used from the enzyme class of polygalacturonase (e.g. commercial product "Pectinex" "1X/3X/5X" from Novozymes).

In another embodiment, the pectinase is added to the extract at a temperature of between about 25 and about 55 C and the resulting pH is between about 5.5 and about 6.0. In another example, the amount of pectinase to be added fall within a range of 0.05 to 0.2 wt % of the weight of the solids in the extract [. In one example, the mixture is held, for example, at about 50 C for 100 minutes while being agitated to achieve the enzyme treatment. Next, a heat treatment is performed on the slurry to inactivate the enzyme action of the pectinase. For example, the slurry can be heated at about 80 C for about 10 minutes.

In one embodiment, the pectinase and/or mannase is fed to the extract in the extractor at low temperature to obtain an extract slurry. The extract slurry containing the pectinase is hot extracted to complete the extraction process and the coffee cherry husks are separated from the extract. In one example, the extract is then pasteurized and/or heat concentrated. This heat treatment deactivates the pectinase. In one example of a continuous enzyme treatment process, the extract is heated to between about 21 C and 63 C. The pectinase is then metered continuously into the extractor. The pH of the pectinase containing solution is adjusted to about 4.5 to about 5. In one example, the flow of extract and enzymes through the extractor is preferably co-current. The length, diameter and flow rates of the system are such that they provide a minimum contact time of at least about 60 minutes. The maximum is about 2 hours or more, depending upon the degree of extraction desired balanced against economics.

In another embodiment, aroma stripping can be conducted on the coffee cherry pulp and/or coffee cherry husk extracts. Aroma stripping can be conducted at various parts of the process. For example, aroma can be stripped during extraction, after extraction, during filtration, after filtration, during ultra-filtration, after ultra-filtration, after pectinase treatment, and/or during concentration. In one example, the stripped aroma is condensed and collected. In a further embodiment, the separated or decanted extract may then be stripped if desired, to collect additional aroma. The optionally stripped extract is then cooled and polished by centrifugation or other clarification methods such as filtration and the like. In another embodiment, the stripped aroma is added back to the concentrate stream at a desired level to produce a single component.

In another example, the extract is evaporated using a two-stage plate vacuum evaporator. The evaporator is fitted with a pre-stripping section to recover volatile components (i.e. aroma) of the extract that would otherwise be lost in the vacuum evaporation. A condensate containing the volatiles was collected separately.

In yet another embodiment, the concentrated extract is polished at a solids concentration of about 4% to about 10%. In a further embodiment, the extract temperature should be about 49 C or less. The extract is fed to a centrifuge where it is spun for nominally about 1 minute at approximately 8,000 times gravity. The sludge is disposed of and the polished extract retained for formulating into the finished beverages. In one specific embodiment, during centrifugal polishing, a selected solids content of the extract and a particular temperature are employed to produce a beverage formulation of the desired color, clarity and acid stability. After polishing, the extract may then be further concentrated.

In yet another embodiment, the process for making a beverage formulation comprises a pasteurization step. The treatment in any particular case typically depends on the nature of the microorganism (or toxin produced by the microorganism). For example, pasteurization may occur at about 115 C for about 3 seconds so as to destroy the spores of the heat and acid resistant "alycyclobacilli" which has been associated with non pathogenic spoilage of ready to drink refreshment beverages.

In a further embodiment, examples of additional components that are added to produce a beverage formulation comprise, but are not limited to, water, sugar, fat, protein, amino acid, vitamins, anti-oxidant, polyphenol, caffeic acid, ferulic acid, chlorogenic acid, anti-oxidant, colorants and other flavoring agents. For example, flavoring agents include, but are not limited to, sweeteners such as sugar, corn syrup, fructose, dextrose, maltodextrose, sucralose, cyclamates, saccharin, phenylalanine, xylitol, sorbitol, and maltitol.

The following are examples of beverage formulations that illustrate embodiments of the present invention. For example, beverage formulations may be in the range of about 5 to about 30% of standardized extract (which is equivalent to about 0.4 to about 2.4% extract solids based on total liquid) and about 5 to about 15% sweeteners.

| Extract % | Sucrose % | Fructose % | Flavour | pH |
|---|---|---|---|---|
| 10 | 12.04 | 0.00 | A | 3.2 |
| 7 | 2.64 | 2.64 | C | 3.5 |
| 7 | 5.15 | 0.00 | A | 2.9 |
| 7 | 6.49 | 6.49 | B | 3.5 |
| 7 | 2.64 | 2.64 | B | 2.9 |
| 7 | 8.67 | 0.00 | B | 3.2 |
| 13 | 8.38 | 0.00 | F | 3.2 |
| 13 | 4.85 | 0.00 | C | 3.5 |
| 13 | 4.85 | 0.00 | B | 2.9 |
| 7 | 12.21 | 0.00 | F | 2.9 |
| 10 | 4.45 | 4.45 | C | 3.5 |
| 10 | 9.31 | 3.10 | B | 2.9 |
| 7 | 4.54 | 4.54 | F | 3.2 |
| 7 | 5.17 | 0.00 | F | 3.5 |
| 7 | 6.65 | 2.22 | A | 3.5 |
| 7 | 3.91 | 1.30 | C | 3.2 |
| 13 | 6.41 | 2.14 | A | 2.9 |
| 13 | 9.19 | 3.06 | C | 3.2 |
| 13 | 6.33 | 6.33 | F | 2.9 |
| 10 | 3.81 | 1.27 | F | 2.9 |
| 7 | 12.19 | 0.00 | C | 3.5 |
| 13 | 11.89 | 0.00 | B | 3.5 |

-continued

| Extract % | Sucrose % | Fructose % | Flavour | pH |
|---|---|---|---|---|
| 10 | 8.52 | 0.00 | C | 2.9 |
| 13 | 6.32 | 6.32 | A | 3.5 |
| 7 | 6.49 | 6.49 | C | 2.9 |
| 10 | 3.80 | 1.27 | B | 3.5 |
| 10 | 9.32 | 3.11 | F | 3.5 |
| 13 | 2.48 | 2.48 | C | 2.9 |
| 7 | 6.49 | 6.49 | A | 2.9 |
| 13 | 4.37 | 4.37 | B | 3.2 |
| 13 | 2.49 | 2.49 | F | 3.5 |
| 10 | 2.56 | 2.56 | A | 3.2 |
| 10 | 8.51 | 0.00 | D | 3.2 |
| 10 | 8.52 | 0.00 | E | 3.2 |
| 10 | 8.52 | 0.00 | F | 3.2 |
| 6 | 10.00 | 0.00 |  | 3.0 | where a trained sensory panel found that the flavor was most similar to "A" being blackberry; "B" being passion fruit; "C" being grapefruit; "D" being mango; "E" being strawberry and "F" being cooked and fresh apple notes, honey with a hint of pear.

where the pH was adjusted with malic acid and the concentrate is less than 65° Brix Recipe % is quoted at 8° B solids.

In another embodiment, varying ratio's of husk/pulp to water for extraction of coffee husk or pulp may be carried out at a range of time and temperatures. For example, at higher temperatures, the required time to reach a given yield is lower and vice versa. In another example, at temperatures above about 90 C, it is found that the quality of the extract may be reduced through the production of pronounced cooked notes. In yet another example, at lower temperatures, the quality of the extract may be satisfactory but, in one example, tests have shown that about 40 hours is needed to obtain a reasonable yield.

In yet another embodiment, the method of the present invention can result in one or more of the following: better acid stability, improved color, clarity, cold water solubility, flavor and higher yield. For purposes of the examples, color and clarity are measured using a Spectrocolorimeter (e.g. HunterLab LabScan 2 with LabScan Software). The color of products is represented by the following parameters: $L^*$, brightness (scale from 0=dark to 100=white); $a^*$, red-green scale ($+a^*$ for red; $-a^*$ for green; the higher the numerical value, the more intensive the colour impression.); $b^*$, yellow-blue scale ($+b^*$ for yellow; $-b^*$ for blue; the higher the numerical value, the more intensive the color impression. The sample is illuminated under standardized conditions (standard light D65, standard Observer CIE 1964/1931 (10°/2°)). The diffuse reflected light is collected and from the spectral data obtained, the Standard Colour values X, & Y and Z (Y, x, y depending on the instrument) are calculated. These are then transformed to the color parameters $L^*$, $a^*$ and $b^*$ according to the CIE LAB system. The process involves starting the measurement according to the user manual and record retrieved color values $L^*$, $a^*$, $b^*$. Clean cuvettes immediately after each series of samples. Wash cuvettes with warm water and then rinse with dionized water. The glass cuvette is a quartz glass bottom, (inside Ø6.1 cm). In one embodiment, a haze value, which is conducted within one hour of making the beverage, of less than about 10 units, more particularly 5 units, is acceptable.

Examples of color parameters of the beverage formulation of the present invention with a transmission path of 10 mm cuvette; and standardization as per HL software with black/white tiles and $L^*$, $a^*$ and $b^*$ and haze according to the CIE LAB system include, but are not limited to, L=85.51, a=1.87, b=29.39 and haze=2.16; L=88.62, a=0.49, b=24.4 and haze=4.06; and L=88.67, a=0.44, b=24.38 and haze=3.56.

The following examples are merely illustrative of the present invention and are not meant to limit the invention to the embodiments shown in the examples.

EXAMPLE 1

Approximately 500 kg of coffee cherry husk (variety Mundo Novo) were extracted with about 2500 kg of heated potable water at 75° C. in a column extractor using a counter-current flow pattern. Approx 2000 kgs of extracted liquid with a soluble solids content of 6.3° Brix was recovered. The extracted liquid was centrifuged through an Alpha Laval desludging centrifuge at 7 C to partially remove the suspended soluble solids. The centrifuged extract was then filtered through an ultra filtration system containing membranes (i.e. PCI membranes—FP200/FPT20) with a 200,000 kDalton cut-off. The filter was set up such that liquid extract was collected and the membrane retentate was returned to the feed tank. Extract was added to the feed tank to maintain a working level as required. When all extract was added, the unit was allowed to run until the level of returned retentate was reduced to a level which prohibited further pumping.

Approximately 1300 kg of extract at 5.5° Brix was recovered. The extract was found to be clear and bright. Analysis shows a more than about 75% drop in pectin level from about 102 mg/gm solids to about 26.5 mg/gm solids.

EXAMPLE 2

Approximately 1300 kg of the ultra-filtration extract from Example 1 was evaporated using a two-stage plate vacuum evaporator. The conditions were a vacuum at about 1.75 bar vacuum and temperature of About 55 to about 65 C. The evaporator was fitted with a pre-stripping section to recover volatile components (i.e. aroma) of the extract that would otherwise be lost in the vacuum evaporation A condensate containing the volatiles was collected separately. The evaporator yielded coffee cherry concentrate with a brix value of approx 57.5° Brix. Table 2 below shows an analysis of the aroma components that were recovered.

EXAMPLE 3

Similar conditions were used as in Example 1 except coffee cherry husk (variety Robusta) were extracted. About 70 kg of Robusta extract were prepared. The extract was further ultra-filtered using the conditions of example 02 but is evaporated on a rotary pilot plant evaporator. The condensate and concentrate are collected separately. Table 2 below shows an analysis of the product including an analysis of the aroma components that were recovered.

Comparative Example

The following example illustrates a similar process that is disclosed in the prior art. Approximately 10 kg of coffee cherry husks (Var Mundo Novo from 2004 Brazilian harvest) was mixed with 100 kg de-ionised water at 85° C. in a jacketed tank and held at 85° C.+/−1° C. for 60 minutes. The mixture was continuously stirred by an anchor stirrer rotating at 40 rpm. The mixture was passed through a sieve to remove large insoluble husk particles but is not ultra-filtered. The liquid extract was then dried to form a dry extract. Drying was achieved by vacuum evaporation using a rotary evaporator.

The yield of dehydrated extract was about 10%. Samples of liquid extract and concentrate were analysed chemically and compared to samples of Examples 1, 2 and 3. The liquid extracts were similar but, after ultra-filtration and concentration, the pectin level per gram in the samples of Examples 1-3 were reduced by approx 96%. The table below shows an analysis of the product including an analysis of the aroma components that were recovered.

The following table compares the extracted and concentrated coffee cherry husks of the Comparative Example to Example 3:

|  | unit | Comparative Ex. Raw Extract | Conc | Example 3 Raw Extract | Conc |
|---|---|---|---|---|---|
| Soluble solids | ° Brix | 3 | 33 | 6.1 | 58 |
| Chlorogenic acid | mg/gm solids | 4 | 3 | 2.56 | 3 |
| Unidentified peaks as chlorogenic acid | mg/gm solids | 3 | 3 | 1.89 | 2 |
| Caffeic Acid | mg/gm solids | 0.07 | 0.06 | 0.26 | 0.12 |
| Caffeine | mg/gm solids | 28 | 23 | 23 | 26 |
| Pectin | mg/gm solids | 79 | 59 | 102 | 26 |
| Ferulic acid | mg/gm solids | 0 | 0 | 0.02 | 0 |
| Polyphenols | mg/gm solids | 7 | 6 | 4.73 | 6 |

EXAMPLE 4

The extracts from Examples 1 through 3 and Comparative Example were used to formulate several liter batches of coffee cherry beverages according to the table below. The beverages were then rated sensorically by a panel of trained sensory experts. A sensoric vocabulary was first defined with terms relating both to flavour and aroma. The samples were then tasted in a statistically derived rotation pattern and scored against the key attributes defined.

|  | Code | Concentrate grams | Aroma grams | Sucrose grams | Water grams | Total grams |
|---|---|---|---|---|---|---|
| Comp. Ex. extract | C | 1806 | 0 | 700 | 4494 | 7000 |
| Comp. Ex. concentrate | Ref | 170 | 0 | 700 | 6130 | 7000 |
| Comp. Ex. concentrate with cond | B | 170 | 1610 | 700 | 4520 | 7000 |
| Ex. 2 arabica concentrate | D | 101 | 0 | 700 | 6199 | 7000 |
| Ex. 2 arabica concentrate plus aroma | E | 101 | 138 | 700 | 6061 | 7000 |
| Ex. 3 robusta concentrate | F | 104 | 0 | 700 | 6196 | 7000 |
| Ex. 3 robusta concentrate plus aroma | G | 104 | 1020 | 700 | 5176 | 7000 |

All samples acidified to pH 3.0 with malic Acid

All concentrate additions recalculated to 8 Brix

EXAMPLE 5

Samples of clarified and ultra-filtered concentrate from Examples 2 and 3 and Comparative Example were mixed with quantities of condensate collected from each example and analysed by a GCMS method. The condensate addition rate was calculated to be equivalent to that present in table 1 thus mirroring the levels in the final beverage. Sugar, acid and water are omitted so that the samples did not need to be prepared before GCMS. The method was designed to quantify volatile elements of the mixtures. GCMS headspace analysis of Example 2 with added condensate compared to concentrate from the Comparative Example showed increased levels of many chemical compounds linked to flavour and aroma. Table below and Map 2 show an analysis of the product including an analysis of the aroma components that were recovered.

The following table lists the preparation of the samples for GCMS chemical analysis:

| Analytical GCMS samples | Concentrate | Condensate | Brix |
|---|---|---|---|
| Comp. Ex. concentrate only | 100 | 0 | 33.2 |
| Comp. Ex. with condensate | 5 | 50 |  |
| Comp. Ex. concentrate | 100 | 0 | 56 |
| Example 2 with condensate | 34 | 35 |  |
| Example 3 concentrate | 100 | 0 | 54 |
| Example 3 with condensate | 5 | 51 |  |
| Brazil Cold extraction concentrate | 100 | 0 | 82 |
| Brazil Cold with condensate | 2 | 51 |  |

The following Table 2 is a GCMS headspace analysis of Example 2 with added condensate compared to concentrate from the Comparative Example. Example 2 shows increased levels of numerous chemical compounds linked to flavour and aroma

| Compound | Sensory descriptor | Example 2 ug/Brix (Relative to Internal standard) | Comparative Ex. ug/Brix (Relative to Internal standard) |
|---|---|---|---|
| 2 methypropanal | Apple | 380 | 137 |
| Beta damascone | Apple, honey, sweet, tobacco | 1 | 0 |
| Phenyl acetaldehyde | Green, honey | 4 | 1 |
| 2 methylbutanal | Green | 375.05 | 122.6 |
| 3 methybutanal | Green | 307 | 65 |
| 2 methylbutanol | Green | 135 | 1 |

-continued

| Compound | Sensory descriptor | Example 2 ug/Brix (Relative to Internal standard) | Comparative Ex. ug/Brix (Relative to Internal standard) |
|---|---|---|---|
| Limonene | Citrus | 2 | 0 |
| Linalool | Citrus, floral, green | 61 | 2 |
| Alpha terpinolene | Citrus, pine | 1 | 0 |
| Terpinene | Lemon, lime. Citrus | 0 | 0 |
| Valancene | Citrus, woody | 0 | 0 |
| Ethyl acetate | Fruity | 27 | 0 |
| Cis linalool oxide | Floral | 3.85 | 0.07 |
| Trans linalool oxide | Floral | 4 | 0 |

-continued

| Compound | Sensory descriptor | Example 2 ug/Brix (Relative to Internal standard) | Comparative Ex. |
|---|---|---|---|
| Safranal | Sweet, herbaceous | 1 | 0 |
| Acetaldehyde | Pungency | 106 | 27 |
| Diacetyl | Buttery | 67 | 40 |
| Furfural | Sweet, bready | 128 | 207 |
| Hexanal | Winey | 210 | 10 |
| Dimethytrisulphide | Cabbage | 0 | 0 |
| Dimethylsulphide | Cabbage | 4 | 1 |
| Dimethyldisulphide | Cabbage | 2.56 | 0.23 |

Graph F provides an aroma analysis of the extracted and concentrated coffee cherry husks of the Comparative Example to Example 3. Graph F shows a seven-fold increase of Example 3 with add-back compared Comparative Example.

EXAMPLE 6

Samples of clarified and ultra filtered concentrates from Examples 2 and 3 were combined with a quantity of condensate from Example 2 and used to formulate a beverage. The beverage retained the sensoric character of an all arabica beverage but has increased levels of caffeine due to the Robusta content. At higher concentrations of Robusta, a flavour change occurred due to increasing medicinal notes of the Robusta concentrate. A trained panel noticed a change at X % robusta and found that the flavour unacceptable at Y % robusta due to medicinal and sacky notes. The table below illustrates the caffeine level of the beverage formulation of the present invention using a blend of arabica and robusta.

|  | weight grams | weight grams | weight grams |
|---|---|---|---|
| Ex. 2 arabica concentrate | 101 | 91 | 76 |
| Ex. 3 robusta concentrate | 0 | 10 | 25 |
| Ex. 2 arabica aroma | 138 | 138 | 138 |
| Sucrose | 700 | 700 | 700 |
| Water | 6061 | 6061 | 6061 |
| Total | 7000 | 7000 | 7000 |
| Caffeine mg/l | 108 | 126 | 153 |

EXAMPLE 7

Approximately 500 kg of fresh coffee cherry pulp obtained by sieving coffee beans from ripe coffee fruit was comminuted in a blender with 1000 kg of water at 20° C. and left to rest for 15 minutes. The mixture was then sieved through a rotary brush sieve or fruit finisher to extract the liquid. Approx 840 kg of extract at 3.8 brix was recovered. The extract was then centrifuged and ultrafiltered as in example 2. The extract was evaporated as per Example 2. The extract or concentrate was used to produce beverages formulations that were of the type shown in the Table for Example 4.

Although the foregoing invention has been described in terms of certain preferred embodiments, other embodiments will become apparent to those of ordinary skill in the art in view of the disclosure herein. Accordingly, the present invention is not intended to be limited by the recitation of preferred embodiments, but is intended to be defined solely by reference to the appended claims.

What is claimed is:

1. A beverage formulation, comprising:
a beverage having caffeine, wherein the beverage contains caffeine levels in the range of about 0.07 to about 0.30 mg/ml and having an added aroma;
wherein the beverage consists of an extract that is derived from at least one member of the group consisting of coffee cherry husks and coffee cherry pulp;
wherein the extract is in the range of about 5 to about 30% based on standardized extract of the beverage;
wherein at least a portion of the caffeine is derived from the extract; and
wherein at least a portion of the added aroma is derived from aroma recovered from the extract.

2. A beverage formulation, comprising:
a beverage having caffeine, wherein the beverage contains caffeine levels in the range of about 0.07 to about 0.30 mg/ml, being optically clear, and having an added aroma;
wherein the beverage consists of an extract that is derived from at least one member of the group consisting of coffee cherry husks and coffee cherry pulp;
wherein the extract is in the range of about 5 to about 30% based on standardized extract of the beverage;
wherein at least a portion of the caffeine is derived from the extract;
wherein the optically clear is measured by a haze value of below about 10; and
wherein at least a portion of the added aroma is derived from aroma recovered from the extract.

3. The beverage formulation of claim 1 wherein the extract is prepared from the process comprising the steps of:
extracting soluble constituents using water from at least one member of the group consisting of coffee cherry husks and coffee cherry pulp;
separating the extract of the at least one member from the water; and
concentrating the extract.

4. The beverage formulation of claim 2 wherein the extract is prepared from the process comprising the steps of:
extracting soluble constituents using water from at least one member of the group consisting of coffee cherry husks and coffee cherry pulp;
separating the extract of the at least one member from the water; and
concentrating the extract.

5. The beverage formulation of claim 1 wherein the extract is prepared from the process comprising the steps of:
extracting soluble constituents using water from at least one member of the group consisting of coffee cherry husks and coffee cherry pulp;
separating the extract of the at least one member from the water;
processing the extract to remove a sufficient amount of naturally occurring pectin so as to result in the beverage being optically clear, wherein the optically clear is measured by a haze value of below about 10; and
concentrating the extract.

6. The beverage formulation of claim 2 wherein the extract is prepared from the process comprising the steps of:
extracting soluble constituents using water from at least one member of the group consisting of coffee cherry husks and coffee cherry pulp;
separating the extract of the at least one member from the water;

processing the extract to remove a sufficient amount of naturally occurring pectin so as to result in the beverage being optically clear, wherein the optically clear is measured by a haze value of below about 10; and
concentrating the extract.

7. The beverage formulation of claim 1 wherein the extract is prepared from the process comprising the steps of:
extracting soluble constituents using water from at least one member of the group consisting of coffee cherry husks and coffee cherry pulp;
separating the extract of the at least one member from the water;
recovering the aroma from the extract; and
concentrating the extract.

8. The beverage formulation of claim 2 wherein the extract is prepared from the process comprising the steps of:
extracting soluble constituents using water from at least one member of the group consisting of coffee cherry husks and coffee cherry pulp;
separating the extract of the at least one member from the water;
recovering the aroma from the extract; and
concentrating the extract.

9. The beverage formulation of claim 1 wherein the extract is prepared from the process comprising the steps of:
extracting soluble constituents using water from at least one member of the group consisting of coffee cherry husks and coffee cherry pulp;
separating the extract of the at least one member from the water;
filtering the extract to remove a sufficient amount of naturally occurring pectin so as to result in the beverage having stability, wherein the stability is measured by a haze value below about 10;
recovering aroma from the extract; and
concentrating the extract.

10. The beverage formulation of claim 2 wherein the extract is prepared from the process comprising the steps of:
extracting soluble constituents using water from at least one member of the group consisting of coffee cherry husks and coffee cherry pulp;
separating the extract of the at least one member from the water;
filtering the extract to remove a sufficient amount of naturally occurring pectin so as to result in the beverage having stability, wherein the stability is measured by a haze value below about 10;
recovering aroma from the extract; and
concentrating the extract.

11. The beverage formulation of claim 5 wherein the processing step is selected from the group consisting of an enzyme treatment and ultra-filtration treatment.

12. The beverage formulation of claim 6 wherein the processing step is selected from the group consisting of an enzyme treatment and ultra-filtration treatment.

13. The beverage formulation of claim 11 wherein the enzyme treatment employs pectinase.

14. The beverage formulation of claim 12 wherein the enzyme treatment employs pectinase.

15. The beverage formulation of claim 11 wherein the ultra-filtration employs a membrane.

16. The beverage formulation of claim 12 wherein the ultra-filtration employs a membrane.

17. The beverage formulation of claim 1 wherein the extract is prepared from the process comprising the steps of:
extracting soluble constituents at about 75 C using water from at least one member of the group consisting of coffee cherry husks and coffee cherry pulp;
separating the extract of the at least one member from the water using a centrifuge;
processing the extract to remove a sufficient amount of naturally occurring pectin so as to result in the beverage being optically clear, wherein the optically clear is measured by a haze value below about 10 and wherein an ultra-filtration system is used to filter the extract;
recovering aroma from the extract; and
concentrating the extract.

18. The beverage formulation of claim 2 wherein the extract is prepared from the process comprising the steps of:
extracting soluble constituents at about 75 C using water from at least one member of the group consisting of coffee cherry husks and coffee cherry pulp;
separating the extract of the at least one member from the water using a centrifuge;
processing the extract to remove a sufficient amount of naturally occurring pectin so as to result in the beverage-being optically clear, wherein the optically clear is measured by a haze value below about 10 and wherein an ultra-filtration system is used to filter the extract;
recovering aroma from the extract; and
concentrating the extract.

19. The beverage formulation of claim 1 further comprising flavor components in the range of about 5% to about 15% of the total liquid and consisting of the group of sweeteners selected from sugar, corn syrup, fructose, dextrose, maltodextrose, sucralose, cyclamates, saccharin, phenylalanine, xylitol, sorbitol, and maltitol.

20. The beverage formulation of claim 2 further comprising flavor components in the range of about 5% to about 15% of the total liquid and consisting of the group of sweeteners selected from sugar, corn syrup, fructose, dextrose, maltodextrose, sucralose, cyclamates, saccharin, phenylalanine, xylitol, sorbitol, and maltitol.

21. The beverage formulation of claim 1 wherein the extract is derived from at least one member of the group consisting of coffee cherry husks of Arabica coffee and coffee cherry pulp of Arabica coffee.

22. The beverage formulation of claim 2 wherein the extract is derived from at least one member of the group consisting of coffee cherry husks of Arabica coffee and coffee cherry pulp of Arabica coffee.

23. The beverage formulation of claim 1 wherein the extract is derived from at least one member of the group consisting of coffee cherry husks of Robusta coffee and coffee cherry pulp of Robusta coffee.

24. The beverage formulation of claim 2 wherein the extract is derived from at least one member of the group consisting of coffee cherry husks of Robusta coffee and coffee cherry pulp of Robusta coffee.

25. The beverage formulation of claim 1 wherein the extract is derived from at least one member of the group consisting of coffee cherry husks of a combination of Robusta and Arabica coffee and coffee cherry pulp of a combination of Robusta and Arabica coffee.

26. The beverage formulation of claim 2 wherein the extract is derived from at least one member of the group consisting of coffee cherry husks of a combination of Robusta and Arabica coffee and coffee cherry pulp of a combination of Robusta and Arabica coffee.

* * * * *